US005172925A

United States Patent [19]

Kendrick et al.

[11] Patent Number: 5,172,925

[45] Date of Patent: Dec. 22, 1992

[54] MOBILE PRONE STANDER WITH POSITIONING CHAIR

[75] Inventors: Talton C. Kendrick, San Francisco; Sterling D. Wiemken, Fremont; Christopher Lacson, Portola Valley, all of Calif.

[73] Assignee: Quickie Designs Inc., Fresno, Calif.

[21] Appl. No.: 847,432

[22] Filed: Mar. 6, 1992

Related U.S. Application Data

[63] Continuation of Ser. No. 364,368, Jun. 9, 1989, abandoned.

[51] Int. Cl.[5] .......... A61H 3/04; B62M 1/14

[52] U.S. Cl. .......... 280/250.1; 280/5.26; 280/47.16; 280/304.1; 297/DIG. 10

[58] Field of Search .......... 280/250.1, 304.1, 5.2, 280/5.26, DIG. 10, 47.16; 180/8.2, 65.6, 907; 297/DIG. 4, DIG. 10

[56] References Cited

U.S. PATENT DOCUMENTS

| | | | |
|---|---|---|---|
| 3,042,131 | 7/1962 | Dovci | 180/41 |
| 3,107,105 | 10/1963 | Heriford | 280/211 |
| 3,127,188 | 3/1964 | Greub | 280/DIG. 10 |
| 3,165,314 | 1/1965 | Clearman | 272/70.3 |
| 3,226,128 | 12/1965 | Grier, Jr. | 280/5.26 |
| 3,493,245 | 2/1970 | Nabinger | 280/250 |
| 3,629,880 | 12/1971 | van Rhyn | 5/86 |
| 3,839,755 | 10/1974 | Iannucci . | |
| 4,029,089 | 6/1977 | Mulholland | 128/80 R |
| 4,054,319 | 10/1977 | Fog | 297/466 |
| 4,099,277 | 7/1978 | Watkins . | |
| 4,155,416 | 5/1979 | Ansmus | 180/214 |
| 4,245,847 | 1/1981 | Knott | 280/5.2 |
| 4,333,681 | 6/1982 | Nelson | 297/83 |
| 4,620,714 | 11/1986 | Davis | 280/250.1 |
| 4,744,578 | 5/1988 | Stearns . | |
| 4,779,881 | 10/1988 | Baker . | |
| 4,802,542 | 2/1989 | Houston et al. | 297/DIG. 10 |
| 4,834,411 | 5/1989 | Willey et al. | 280/250.1 |
| 4,893,827 | 1/1990 | Gay et al. | 280/250.1 |
| 4,927,167 | 5/1990 | Davis | 280/250.1 |
| 4,966,379 | 10/1990 | Mulholland | 280/242.1 |
| 4,968,050 | 11/1990 | Kendrick et al. | 280/250.1 |

FOREIGN PATENT DOCUMENTS

| | | | |
|---|---|---|---|
| 3316014 | 11/1984 | Fed. Rep. of Germany | 280/DIG. 10 |
| 1589584 | 5/1970 | France . | |

OTHER PUBLICATIONS

Zippie TM Tilt-In-Space Ambulatory Apparatus.
Zippie Chair advertising flyer, 2 pages, Motion Designs, Inc., copyright 1988.
Enduro Adult Orientation in Space advertising flyer, 2 pages, Wheel Ring, Inc., dated Jun. 1988.

*Primary Examiner*—Mitchell J. Hill
*Attorney, Agent, or Firm*—Flehr, Hohbach, Test, Albritton & Herbert

[57] ABSTRACT

A mobile inclinable stander with positioning chair (2) includes a mobile frame (4) and a body support frame (18) tiltably mounted to the mobile frame for movement between upright and reclined orientations. Chest (26), waist (28) and knee (30) supports are mounted to the body support frame. A seat (78) is removably mounted to the body support frame below the waist support so that the waist support acts as a back and arm rest of a positioning chair (119) for a user seated on the seat. The positioning chair is tiltable with the body support frame. The seat frame (84) has two sides (86, 88) pivotally attached to each other to permit opposed clamp plates (100) carried by the sides to be clamped onto the tiltable body support frame. The knee supports include a generally horizontal support post (52) mounted to the body support frame and a pivot tube (56) pivotably mounted over the support post. The position of the pivot tube along the support post is adjusted through the use of rubberized positioning rings (58) placed on the support post on either side of the pivot tube. A pair of spaced apart knee pad posts are secured to the pivot tube and have knee pads (68) removably secured thereto to engage the user's leg above and below the user's knee cap.

27 Claims, 7 Drawing Sheets

MOBILE PHONE STANDER WITH POSITIONING CHAIR

This is a continuation of application Ser. No. 07/364,368 filed Jun. 9, 1989, now abandoned.

BACKGROUND OF THE INVENTION

The present invention relates generally to ambulatory devices for individuals who have lost the use of their legs. More particularly, the invention relates to the design and construction of a prone stander having a mobile frame and an inclinable body support which allows the user to move between a vertical or standing position and a forwardly inclined position. The invention provides improvements over the mobile prone stander disclosed in U.S. patent application Ser. No. 256,343 filed Oct. 11, 1988, abandoned, continuing application 492,272 filed Mar. 7, 1990 now U.S. Pat. No. 4,968,050 on Nov. 6, 1990, the disclosure of which is incorporated by reference.

Numerous devices have been developed over the years to enable persons who have lost use of their legs to obtain some degree of mobility. The most familiar device, of course, is the wheelchair where the user, in a sitting position, is able to move by manually rotating a pair of large drive wheels on either side of the seat frame.

Although vastly successful, wheelchairs alone are not able to provide for all needs of the immobilized individual. In many instances, an immobilized person will desire to move about in a generally standing position, which is not possible with most wheelchairs. Additionally, it is frequently desirable to have the ability to lean or incline forward, a capability provided by few, if any, wheelchairs.

To provide these additional capabilities, devices referred to as mobile prone standers have been developed. Generally, these devices comprise a mobile frame having a pair of large drive wheels similar to those seen on conventional wheelchairs. Rather than having a seat for the user, however, the mobile prone stander will include an inclinable body support frame or platform where the user is strapped in a standing position facing the body support frame. The body support frame is able to incline about an axis located relatively near the axis of the main drive wheels so that the user is able to reach the main drive wheels regardless of the position of the support frame. Thus, the user is able to move about while in the standing or any other position. Such mobile prone standers are particularly useful for developmentally disabled children who benefit from an increased ability to explore their surroundings, which is unavailable with conventional wheelchairs.

Previous designs for mobile prone standers, however, have suffered from certain disadvantages. In particular, there has never been a mobile prone stander which incorporated a tilt in space positioning chair which moves between upright and reclined positions. U.S. Pat. No. 4,054,319 to Fogg, Jr. shows a wheelchair designed to enable the user to move between sitting and standing positions. It is not, however, a prone stander. U.S. Pat. No. 4,744,578 to Stearns discloses a prone stander with a removable seat. The seat, because of its positioning above the rear caster wheels, tends to make the apparatus somewhat unstable. Also, such seat, being stationary, can only be used in an upright manner and is therefore not a tilt in space positioning seat.

SUMMARY OF THE INVENTION

The invention is directed to a mobile prone stander with a tilt in space positioning chair. The stander includes a mobile frame having first and second ends with casters, or other ground engaging members, at the ends. Drive wheels are mounted at central positions along the mobile frame. A body support frame is tiltably mounted to the mobile frame for movement between a generally upright (or vertical) orientation and a generally level (or reclined or horizontal) orientation. The terms front and back are used in this application. Front refers to the end of the prone stander which the user is facing. Therefore the direction front and back may change if the user faces different directions when seated and when standing.

The body support frame has a chest support and a waist support mounted to it at first and second positions. The waist support is generally U-shaped. Both the chest and waist supports have a number of cushions to comfortably support the user.

A seat is removably mounted to the body support frame at a third position below the waist support in such a manner that the waist support acts as a seat back and as arm rests for the user. Thus, the waist support and seat constitute a tilt in space positioning chair which is tiltable with the body support between generally upright and reclined positions.

The body support frame preferably includes a central support to which the chest support, waist support and seat are mounted. The frame of the seat is preferably made up of two sides pivotally attached to each other to permit opposed clamp plates, carried by the sides of the seat frame, to engage the tiltable central support. This permits the clamp plates to engage and disengage the central support without removing any of the other parts of the chair, such as the waist or chest supports.

Novel, self aligning knee supports also can be mounted to the central support of the body support frame. (Knee supports are generally needed when the apparatus is used as a prone stander and the user does not use leg braces.) Each knee support includes a generally horizontal support post mountable to the central support at a number of different positions. A pivot tube is pivotably mounted to the support post. The position of the pivot tube along the support post is preferably adjusted through the use of rubberized positioning rings mounted to the support post and placed on either side of the pivot tube. Spaced apart, generally vertically oriented knee pad posts are secured to the pivot tube and extend upwardly and downwardly from the pivot tube. Knee pads are removably secured to the knee pad posts at positions above and below the pivot tube. The knee pads are sized and positioned to engage the user's leg above and below the user's knee cap. Outward lateral movement can be restricted by a generally horizontally extending lateral support secured to the pivot tube and positioned to one side of the knee pads.

A further aspect of the invention relates to the use of a multiple pivot for the body support frame. Using such a pivot allows the body support frame to both pivot and translate as it moves between upright and reclined orientations. This helps keep the center of gravity of the user centered over the mobile frame for even further stability.

Certain persons, especially those with spinal cord injuries, should sit in a wheelchair having what is called a 90-90-90 orientation. That is, the seat back is 90° to the seat, the seat is 90° to the leg supports (to which the foot support platforms are mounted) and the leg supports are 90° to the footrest. Conventional wheelchairs often have leg supports which are positioned directly over the front casters. When the user has relatively short legs this does not cause any problems for achieving the desired 90-90-90 orientation. However, because of the need to keep the center of gravity of the occupied wheelchair low, taller users, with longer legs, must often have the leg supports pivoted forward of the front casters. This, of course, ruins the 90-90-90 orientation.

The present invention can be made so that the front leg supports extend forwardly of the front casters to permit the desirable 90-90-90 orientation to be maintained even with users having long legs. This is possible without raising the set height because the prone stander is in effect counterweighted towards the back (that is, the direction opposite the direction the user is facing when seated in the positioning seat) of the prone stander. Modifying a conventional wheelchair to so position the leg rests would likely cause the wheelchair to become unstable.

One of the main advantages of the invention results from the mounting of a seat to the central support of the body support frame in a manner such that the seat is positioned between the front and rear caster wheels so that the center of gravity of the user is also between the front and rear caster wheels. Doing so helps to stabilize the stander. Mounting the seat to the tiltable central support permits the seat to act as a tilt in space positioning chair as it tilts in space at positions between erect or upright and reclined positions.

Another advantage of the invention accrues through the use of the waist support as the back support and the armrests when the seat is mounted to the central support. This helps keep the cost of the dual purpose mobile prone stander and positioning chair reasonable by making the seat simpler and less complicated.

A further advantage of the invention is the use of movable and replaceable cushions, typically of neoprene, which have appropriately shaped openings which engage spaced apart tubes for both the waist support and the chest support. The size, density, number and positions for the cushions can be varied according to the particular user. Similarly, appropriately configured knee pads can also be made of neoprene or similar material. This allows the knee pads to be easily removed and replaced accordingly the requirements of the particular user.

Other features and advantages of the invention will appear from the following description in which the preferred embodiment has been set forth in detail in conjunction with the accompanying drawings.

DETAILED DESCRIPTION OF THE PREFERRED EMBODIMENT

Figure 1:
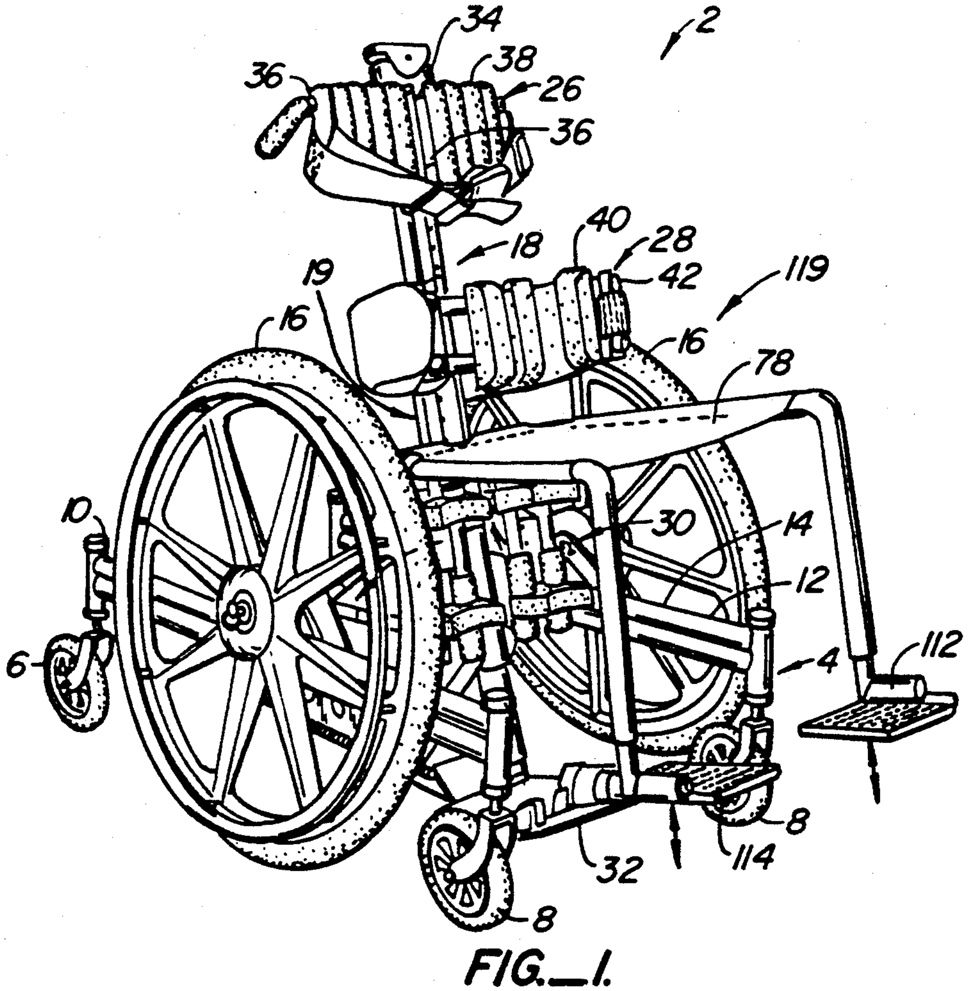
FIG. 1 is an overall perspective view of a mobile prone stander with positioning chair.

Referring now to FIG. 1, a mobile prone stander with positioning chair 2 is shown to include a mobile frame 4 to which first and second sets of caster wheels 6, 8 are mounted at the first and second ends 10, 12 of elongate frame members 4. Caster wheels 8 are preferably mounted to second ends 12 of frame members 14 so to be extendable from their position of FIG. 1. This permits stander 2 to be safely used with a heavier user than would otherwise be possible. A pair of drive wheels 16 are centrally mounted along frame members 14. In the preferred embodiment drive wheels 16 are hand driven; wheels 16 may be motorized as well.

Figure 2:
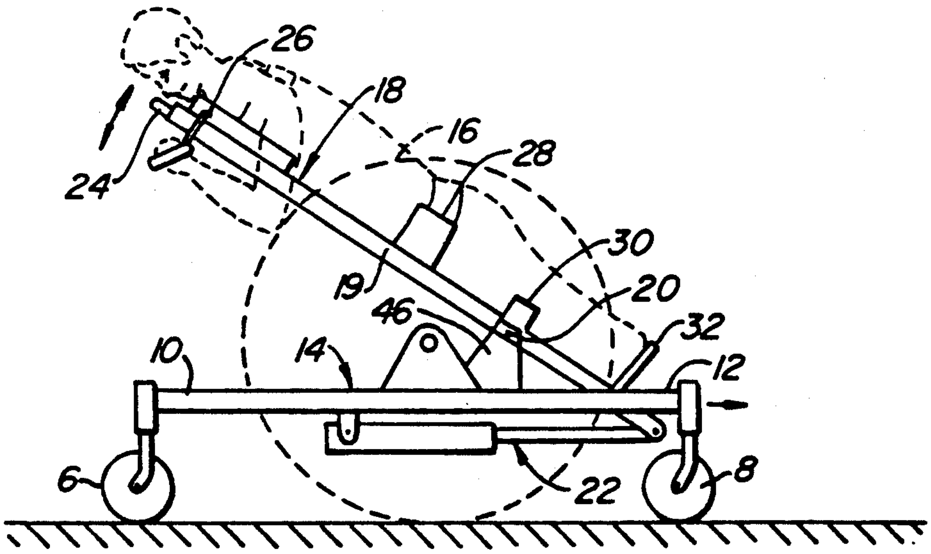
FIG. 2 is a side schematic view of the stander of FIG. 1 with the seat removed and a user shown in phantom.

Stander 2 also includes a body support frame 18 tiltably mounted to the mobile frame at a pivot 20 as shown schematically in FIG. 2. Body support frame 18 includes a central support 19 which is tilted between upright, generally vertical positions and level, generally horizontal position through the actuation of a driver 22. Driver 22 is controlled by the user through a remote control 24. Driver 22 uses a Linak Model LA 25 electric linear actuator made by the Linak Company of Denmark. Other means of raising and lowering body support frame 18 can be used as well.

Stander 2 also includes a chest support 26, a generally U-shaped waist support 28, knee supports 30 and a foot rest 32 mounted to central support 19. Chest support 26, waist support 28 and foot rest 32 all include straps for holding the user in place, as is conventional. Chest support 26 includes a bracket 34 removably mounted to central support and from which a pair of upper and lower tubes 36 extend horizontally in lateral directions. Chest cushions 38, preferably made of neoprene, are removably mounted to tubes 36 and include pairs of generally C-shaped openings (not shown but similar to openings 69 in knee pads 68 of FIG. 3) configured to engage tubes 36. Cushions 38 are sized and spaced to provide the desired support for the user.

Waist support 28 is similar to chest support 26 but is generally U-shaped (to provide lateral support) and has more waist cushions 40 mounted to curved tubes 42 than does chest support 26.

Figure 3A:
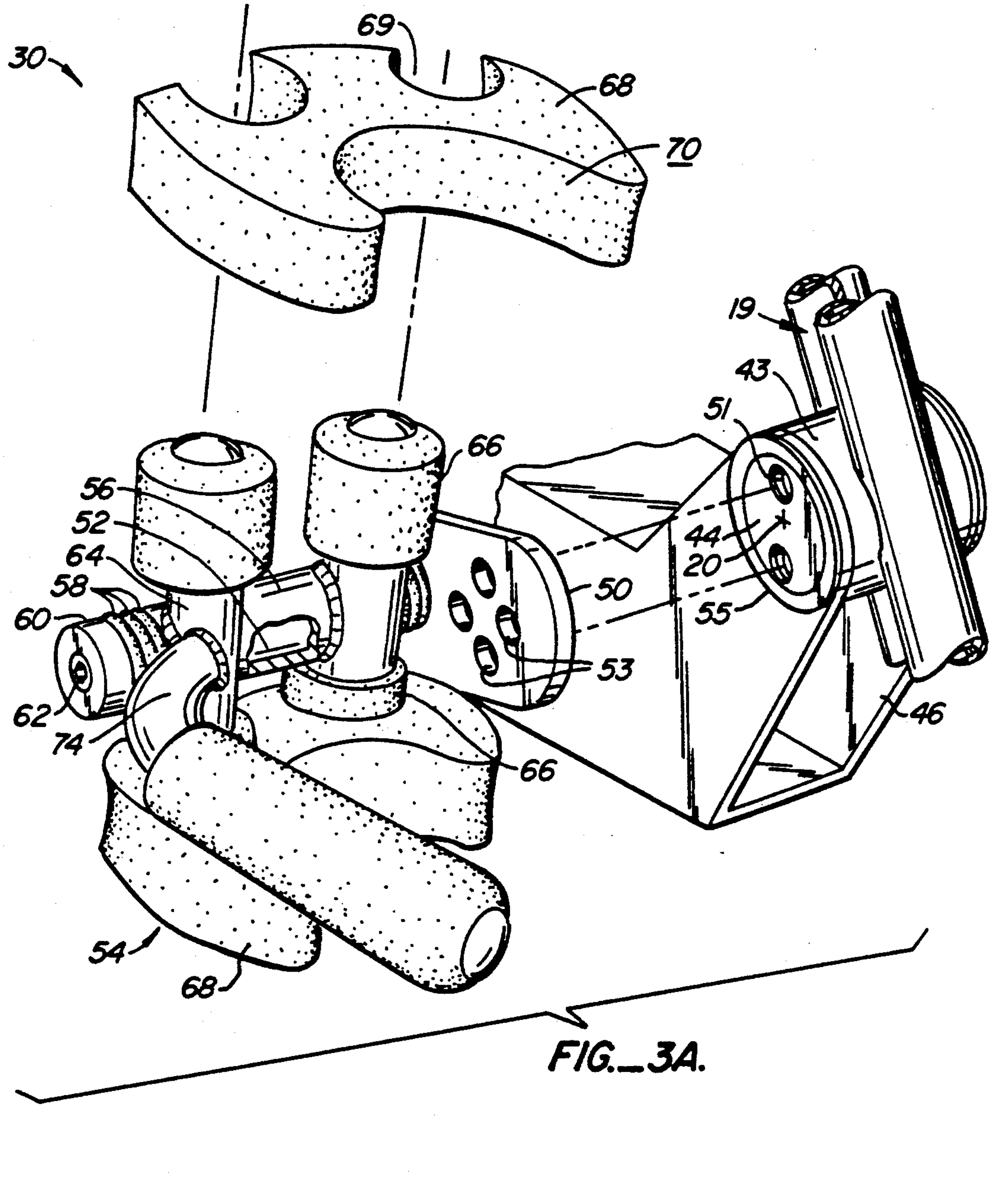
FIG. 3 is a partially exploded perspective view of the knee support of FIG. 1 showing the knee support mount.
Figure 3B:
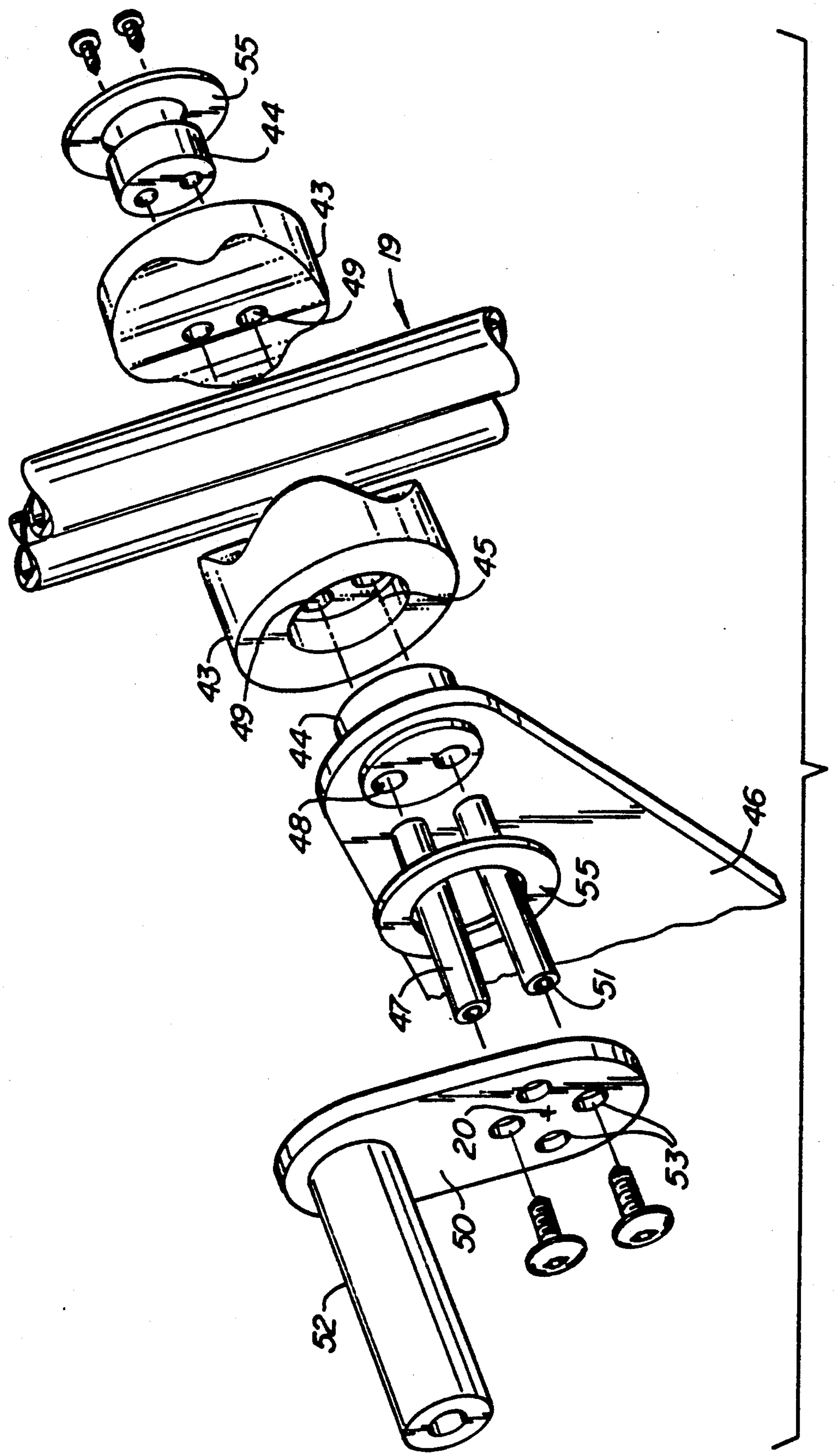
Figure 4A:
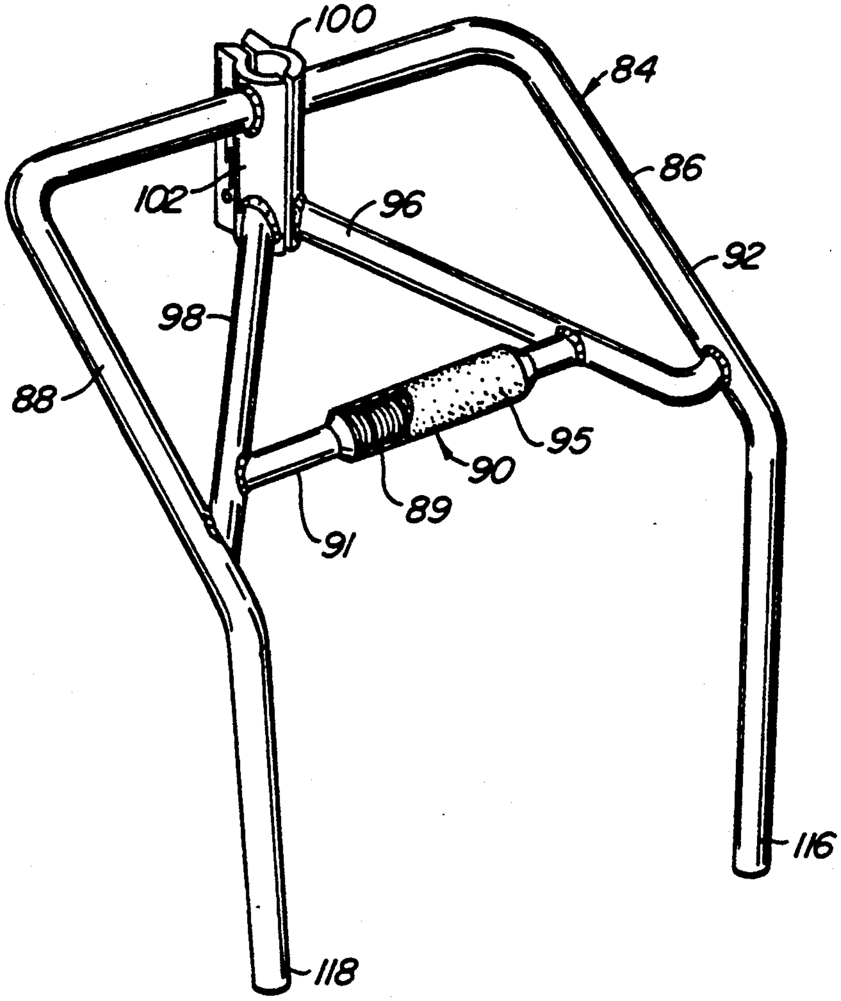
FIG. 4A is a perspective view of the seat frame of the seat of FIG. 1.
Figure 4B:
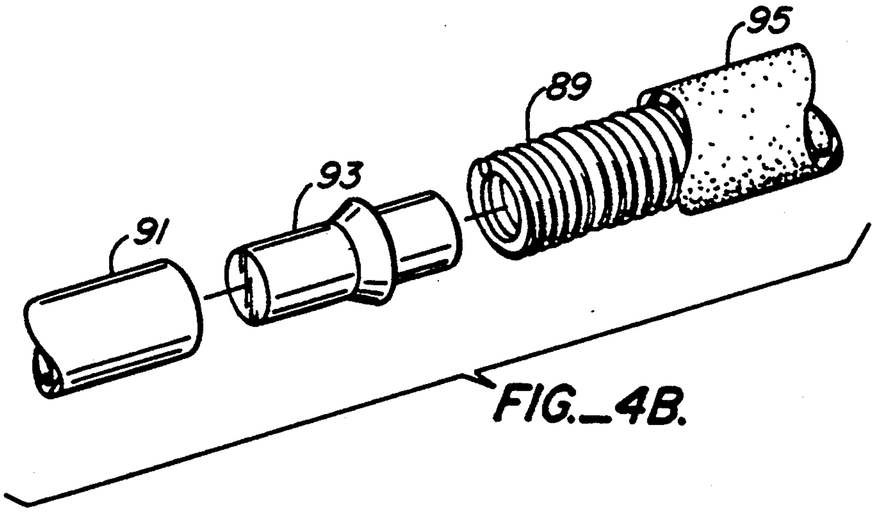
FIG. 4B is an enlarged exploded perspective view of the spring hinge of FIG. 4A.
Figure 4C:
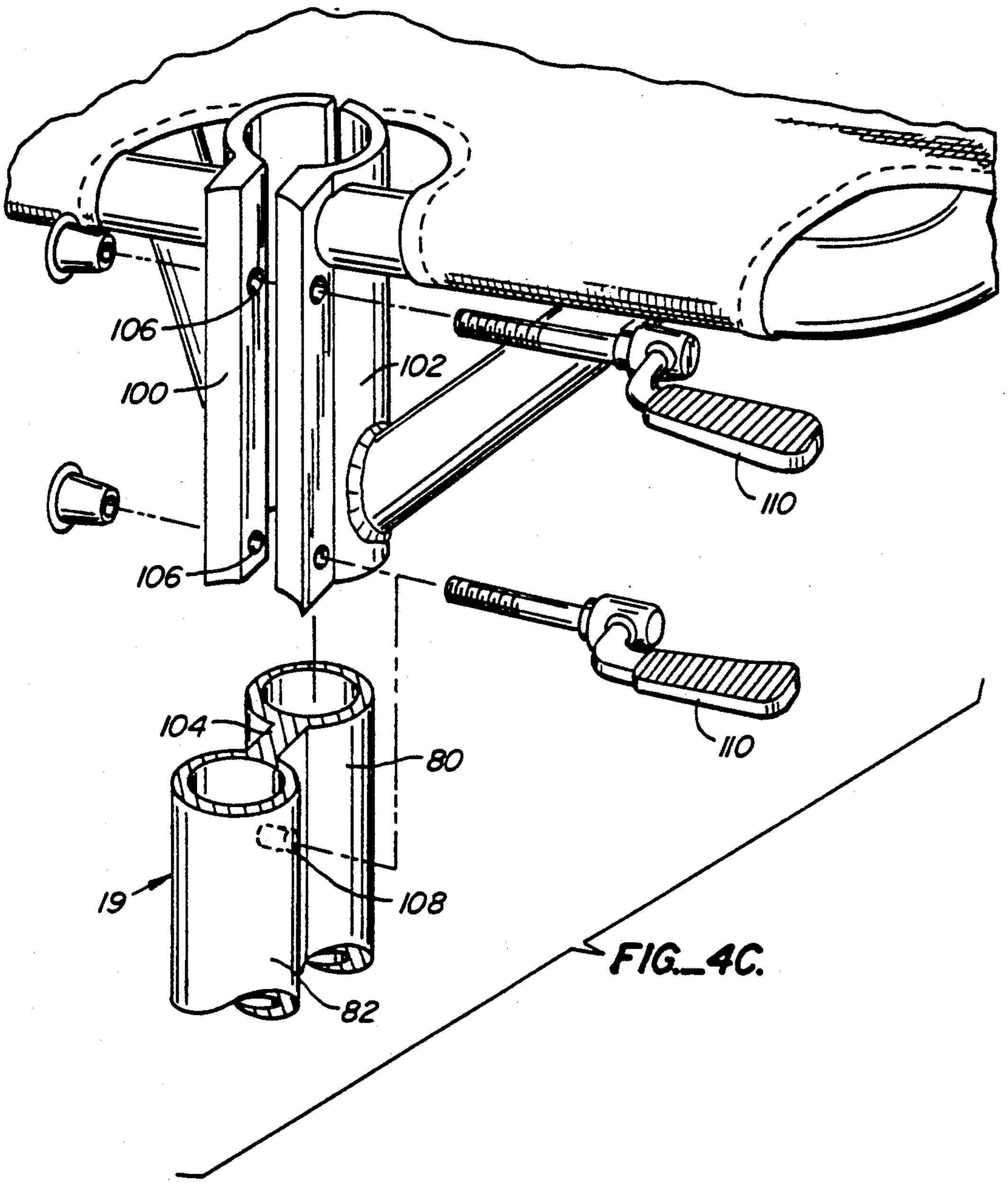
FIG. 4C is an enlarged partially exploded view of the portion of the seat of FIG. 1 showing the cam lock fasteners.

Pivot 20 includes pivot blocks 43 configured to mount flush with central support 19 on either side as shown in FIG. 3B. Bearings 44 are partially housed within bores 45 in blocks 43 and within bores formed in frame extensions 46. Knee supports, see FIG. 3A, are secured to central support 19 at pivot 20 through the use of a pair of threaded standoffs 47 which pass through appropriately positioned holes 48, 49 formed in bearings 44, pivot blocks 43 and the central web 104 of central support 19 (not shown). Threaded holes 51 in the ends of standoffs 47 are positioned to be aligned with two of the four through holes 53 formed in a mounting plate 50 of knee support 30. Washer-like spacers 55 between extensions 46 and plates 50 keep plates 50 from binding on bearings 44. Knee support 30 includes a support post 52 extending horizontally away from mounting plate 50 at a position eccentric of through holes 53. This permits support post 52 to be positioned in one of four positions relative to pivot blocks 43 to help accommodate different users.

A knee pad assembly 54, including a pivot tube 56, is pivotally mounted to support post 52. Assembly 54 is positioned axially along support post 52 through the use of positioning 0-rings 58, typically of neoprene or a like material. Rings 58 not only position pivot tribe 56 along support post 52 but also, due to their frictional characteristics, help to keep knee support 30 in position once placed in position. The 0-rings 58 at the outer end of support post 52 are kept in place by a disk 60 which itself is secured to the end of support post 52 by a large headed screw 62. At the other end of support post 52, rings 58 are captured between mounting plate 50 and pivot tube 56.

Assembly 54 includes a pair of generally vertically oriented (when body support frame 18 is in the upright orientation) knee pad posts 64 welded or otherwise secured to pivot tube 56. Knee pad posts have neoprene collars 66 mounted to their ends. Knee pads 68, having generally C-shaped openings 69 formed therein, engage collar covered knee pad posts 64 so to mount knee pads 68 to posts 64. Knee pads 68 include an arcuate surface 70 sized and shaped to engage the user's leg above and below the knee cap.

The position of knee pad assemblies 54 relative to body support frame 18, as discussed above, can be varied according to which holes 48 are aligned with threaded holes 46. Once that is achieved, lateral positioning of knee pad assemblies 54 can be accomplished by removing screws 62 and disks 60 from support posts 52, removing knee pad assembly 54 from the support post and then redistributing rings 58 according to the lateral positions for knee pad assemblies 54 which are desired. Lateral support for the user's leg is provided by lateral support tubes 74 which are, in the preferred embodiment, welded to the outermost of posts 64 so to be positioned between knee pads 68 and laterally outwardly of the knee pads. Support tubes 74 are covered with a soft material, such as neoprene, for comfort of the user. Knee supports 30, by virtue of the freedom of pivot tubes 56 to pivot about support posts 52, are self aligning to help accommodate the particular structure of the user's leg.

Turning now to FIGS. 1 and 4A-4C, stander 2 is seen to include a seat assembly 78 removably mounted to central support 19 of body support frame 18. Central support 19 includes first and second parallel tubes 80, 82 to which seat assembly 78 clamps. Seat 78 includes a seat frame 84 having two identical sides 86, 88 coupled together by a hinged brace 90. Sides 86, 88 are mirror images of each other and include side members 92, 94 and brace members 96, 98. Hinged brace 90 extends between brace members 96, 98. Hinged brace 90 includes a strong coil spring 89 secured to tube sections 91 by plugs 93. Plugs 93 are friction fit within spring 89 and tube sections 91 to provide a resilient hinge structure. Spring 89 is covered, such as with a material 95 similar to that used as handle grips. Spring 89 biases sides 86, 88 towards the orientation of FIG. 4A.

Seat assembly 78 also includes clamp plates 100, 102 to which ends of sides 86, 88 and corresponding underlying ends of brace members 96, 98 are welded or otherwise secured. Clamp plates 100, 102 are configured to engage tube 80 and the web 104 between tubes 80, 82. Clamp plates 100, 102 and web 104 have openings 106, 108 to permit the passage of cam lock fasteners 110 therethrough which lock seat assembly 78 securely to the central support 19 of body support frame 18.

Foot rests 112, 114 are adjustably secured to the lower ends 116, 118 of sides 86, 88 to accommodate users with different length legs. As shown in FIG. 1, foot rests 112, 114 extend in front of casters 8. This permits a wide range of adjustment of foot rests 112, 114 without the reed to raise seat 78. Thus, users with relatively long legs can use positioning chair 119 while maintaining a low center of gravity, as is desirable. Although foot rests 112, 114 may extend in front of casters 8 in the preferred embodiment, seat 78, being mounted to central support 19, keeps the center of gravity of the user well between casters 8, 10 and thus keeps the apparatus stable.

By appropriately positioning seat 78 beneath waist support 28, the combination of seat 78 and waist support 28 acts as a tilt in space positioning chair 119, waist support 28 providing the back and arm rests of positioning chair 119. Thus, waist support 28 serves a dual function as both a waist support when stander 2 is used as a mobile prone stander (as in FIG. 2) and also as the back and arm rests of a positioning chair when the stander is used in that manner (as in FIG. 1).

The use of stander 2 will first be described without seat 78. The appropriate height of chest support 26, waist support 28 and, when needed, knee supports 30 are adjusted. Positioning rings 58 of knee support 30 may be repositioned on either side of knee pad assemblies 54 according to the proper position desired. In addition, mounting plate 50 may be repositioned relative to threaded holes 51 according to the position which is desired for knee support 30. The proper shape and size of knee pads, according to the size and weight of the user, are selected for use with knee support 30. The user mounts stander 2, is strapped in for safety, and has any final adjustments made to the stander. The user then moves about using drive wheels 16 and adjusts the angle of incline using remote control 24.

When stander 2 is to be used with seat 78, seat 78 is clamped to central support 19 and is secured in place using cam lock fasteners 110. Once seated on seat 78 and strapped into place using the straps on waist support 28, the user adjusts the inclination of body support frame 18 and seat 78 therewith through the use of a second remote control (not shown).

Figure 5:
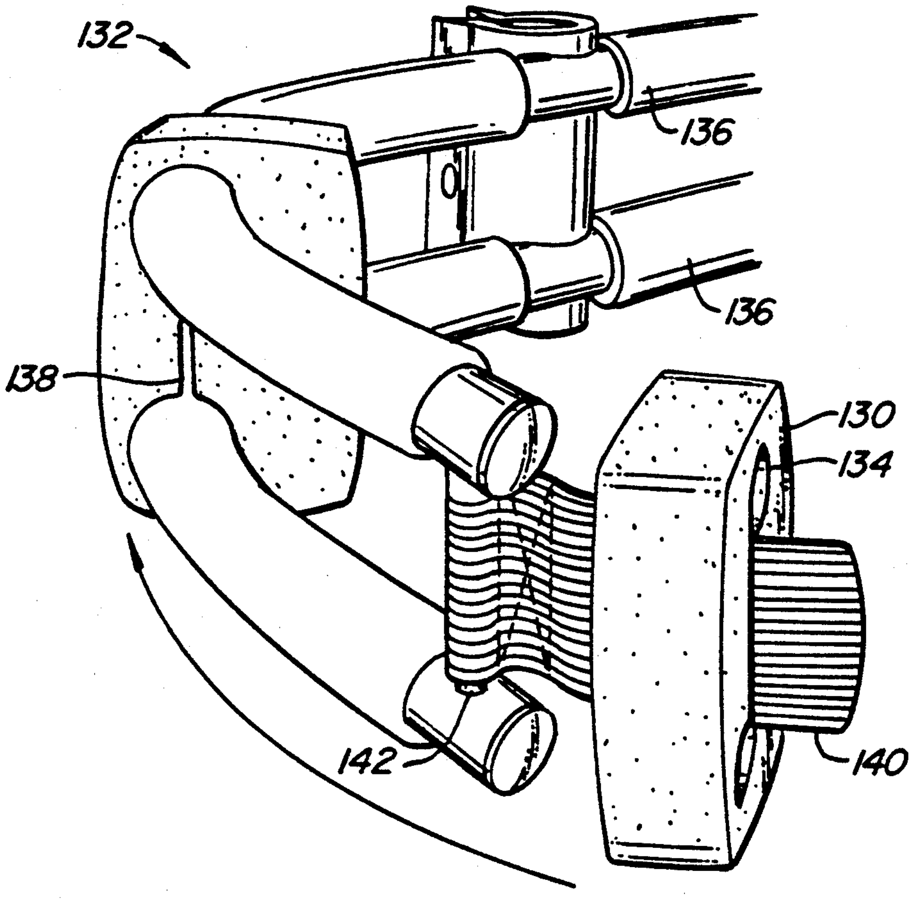
FIG. 5 is an enlarged perspective view of a waist support.

Instead of cushions 38, 40 and pads 68 having C-shaped openings, the cushions and pads could have circular openings. Doing so would require the cushions and pads to be slipped over the ends of the appropriate mounting tubes 36, 42, 64. Although perhaps somewhat less convenient, such cushions and pads may cost less to produce. See FIG. 5, which illustrates the use of waist cushions 130 with a waist support 132. Cushions 130 have two holes 134 sized and positioned to pass over neoprene-covered tubes 136 and having a slit 138 connecting the holes. Slit 138 permits strap 140 and spacer bar 142 to pass through cushions 130 as the cushions are mounted onto tubes 136.

Figure 6:
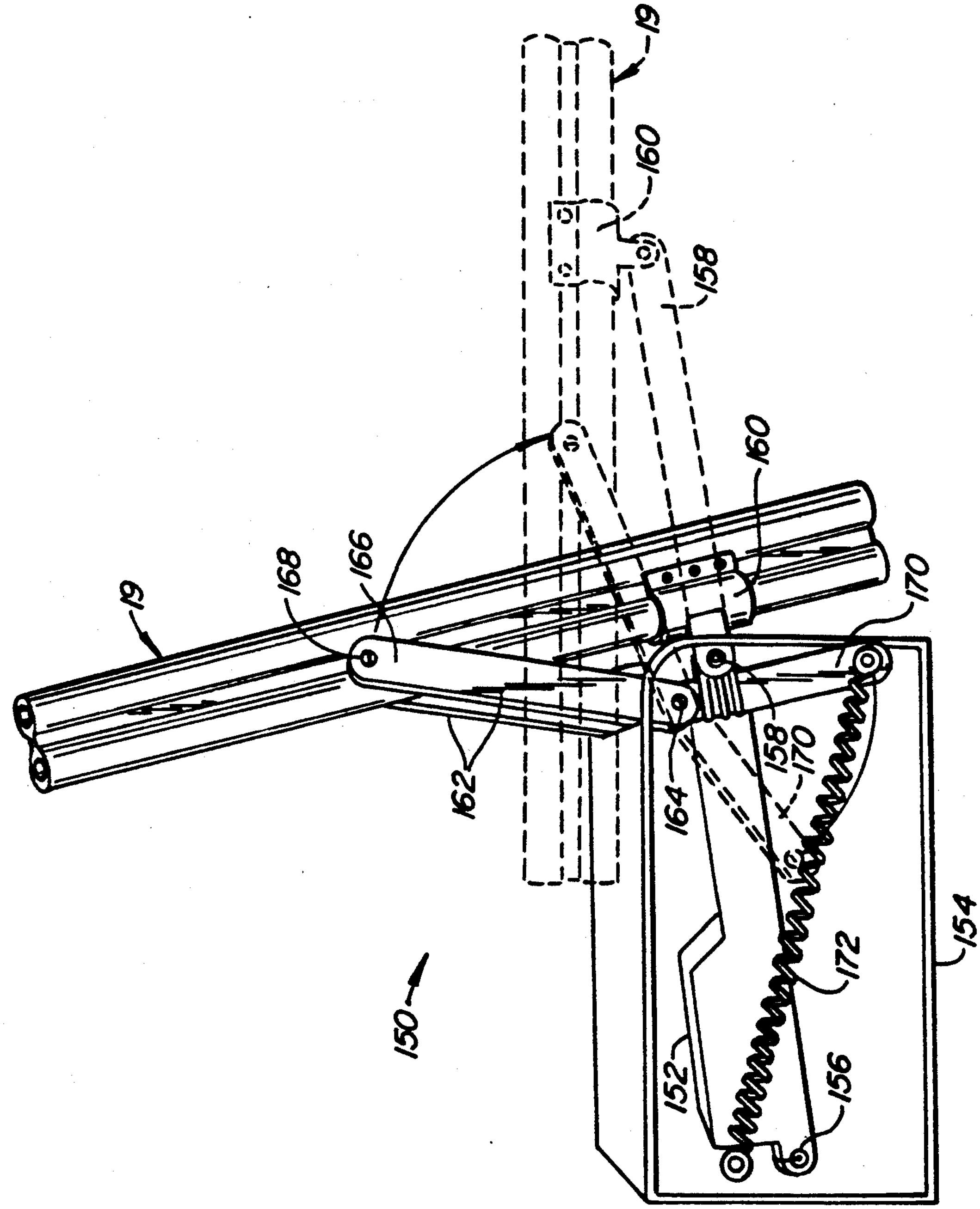
FIG. 6 is an enlarged perspective view of a multiple pivot assembly.

In the embodiment of FIGS. 1-5 central support 19 pivots about a fixed pivot 20. If desired the invention could use a multiple pivot assembly 150 as shown in FIG. 6. Multiple pivot assembly 150 includes a linear actuator 152 pivotally mounted to a frame member 154 at a pivot 156. Actuator 152 includes an extendable end 158 pivotally secured to a bracket 160, the bracket being rigidly mounted to central support 19. Pivot assembly 150 also includes a pair of levers 162 pivotably secured to frame member 154 at central pivots 164. The outer ends 166 of levers 162 are pivotally secured to central support 19 at a fixed position pivot point 168. Pivot point 168 and bracket 160 are fixed relative to central support 19 and are spaced apart from one another. Levers 162 act as rigid links to pivotally secure central support 19 to frame member 154 at pivots 164 so that central support 19 moves with both pivotal and translational movement.

The inner ends 170 of levers 162 are secured to counterbalance 172. Elements 172 act as weight compensators and tend to pivot levers 162 from the dashed line position of FIG. 6 to the solid line positions of FIG. 6. That is, counterbalancing elements 172, which may include compression springs, store the energy from lowering support column 19.

Multiple pivot assembly 150 causes support column 19 to both pivot and translate in space as the column 19 moves between upright and reclined position. This movement causes the user to stay more centered over mobile frame 4 for added stability.

Other modification and variation can be made to the disclosed embodiment without departing from the subject of the invention as defined in the following claims. For example, other types of hinges, in lieu of hinge 90, could be used. Instead of caster wheels 6, 8, low friction guide blocks could be used. The number, size and spacings of chest and waist cushions 38, 40 could be changed according to the requirements of the particular user. Instead of being removable, seat 78 cold be more or less permanently mounted to central support 19 in a manner which would permit seat 78 to be pivoted about support 19 and folded against support 19 when not in use.

What is claimed is:

1. In a mobile ambulatory apparatus including a mobile frame having a first end and a second end, a ground engaging stabilizing member mounted to said mobile frame proximate at least one of said first end and said second end, a pair of drive wheels mounted to opposed sides of said mobile frame between said first end and said second end; and a body support frame mounted to said mobile frame between said drive wheels, a foot rest mounted to said body support frame, a support member mounted to said body support frame in spaced relation above said foot rest for support of a user while standing on said foot rest, and a seat assembly mounted to said body support frame, an improvement in said mobile ambulatory apparatus comprising:

said seat assembly being removably mounted to said body support frame in a position relative to said support member for support of said user's back by said support member while sitting on said seat assembly.

2. The mobile ambulatory apparatus as defined in claim 1, wherein, said support member is at least one of a waist support and a chest support.

3. The apparatus of claim 1 wherein, said support member is provided by a chest support mounted to said body support frame.

4. The apparatus of claim 1 wherein, said ground engaging stabilizing member is provided by a plurality of casters.

5. The apparatus of claim 1 wherein, said support member is provided by a waist support mounted to said body support frame.

6. The apparatus of claim 1 and means tiltably mounting said body support frame to said mobile frame for movement between an upright orientation and a generally reclined orientation.

7. In a mobile ambulatory apparatus including a mobile frame having a first end and a second end, a ground engaging stabilizing member mounted to said mobile frame proximate at least one of said first end and said second end, a pair of drive wheels mounted to opposed sides of said mobile frame between said first end and said second end; and a body support frame mounted to said mobile frame between said drive wheels, a foot rest mounted to said body support frame, and a wist support mounted to said body support frame in spaced relation above said foot rest for support of a user's waist while standing on said foot rest, an improvement in said mobile ambulatory apparatus comprising:

said waist support including a first frame element and a second frame element mounted to said body support frame in vertically spaced apart relation, and said waist support further including a plurality of cushioning elements releasably mounted on said first frame element and said second frame element by spaced apart openings provided in each of said cushioning elements.

8. In a mobile ambulatory apparatus including a mobile frame having a first end and a second end, a ground engaging stabilizing member mounted to said mobile frame proximate at least one of said first end and said second end, a pair of drive wheels mounted to opposed sides of said mobile frame between said first end and said second end; and a body support frame mounted to said mobile frame between said drive wheels, a foot rest mounted to said body support frame, and a support mounted to said body support frame in spaced relation above said foot rest for support of a user while standing on said foot rest, and a seat assembly removably mounted to said body support frame and formed for support of said user in a sitting orientation proximate said drive wheels, an improvement in said mobile ambulatory apparatus comprising:

said seat assembly including a seat frame having a first side and a second side, a first clamp plate secured to said first side, a second clamp plate secured to said second side; said first clamp plate and said second clamp plate releasably coupling said first side and said second side to said body support frame, and a resilient hinge structure mounted between said first side and said second side in spaced relation to said first clamp plate and said second clamp plate.

9. The apparatus of claim 8 wherein, said resilient hinge structure includes a coil spring pivotally biasing said first clamping plate and said second clamping plate; and at least one fastener releasably fastening said first clamping plate to said second clamping plate.

10. The apparatus of claim 8 wherein, said seat frame includes a horizontal brace coupling said first side and said second side and said resilient hinge structure is positioned centrally along said brace.

11. In a mobile ambulatory apparatus including a mobile frame having a first end and a second end, a ground engaging stabilizing member mounted to said mobile frame proximate at least one of said first end and said second end, a pair of drive wheels mounted to opposed sides of said mobile frame between said first end and said second end; and a body support frame mounted to said mobile frame between said drive wheels, a foot rest mounted to said body support frame, a support mounted to said body support frame in spaced relation above said foot rest for support of a user while standing on said foot rest; and a knee support assembly mounted to said body support frame in spaced relation to said foot for support at said user's knee, an improvement in said mobile ambulatory apparatus comprising:

said knee support assembly including a generally horizontally oriented support post mounted to said body support frame, a pivot tube pivotally mounted to said support post for pivotal movement about a horizontally extending axis through said support post, and a knee pad secured to said pivot tube for pivotal movement with said pivot tube.

12. The mobile ambulatory apparatus as defined in claim 11 wherein, said knee pad is mounted to said pivot tube by a knee pad post, and said knee pad is formed to engage the knee of said user on either side of the user's knee cap.

13. The apparatus of claim 11 and at least one positioning ring mounted onto said support post and engaging said pivot tube and positioning said pivot tube along said support post.

14. The apparatus of claim 13 wherein, said knee support assembly includes a plurality of positioning rings each made of a rubber material frictional resisting the pivotal movement of said pivot tube about said support post.

15. The apparatus of claim 11 wherein, said knee support assembly further includes a lateral support secured to one of said support post and said pivot tube, said lateral support extending generally horizontally and to one side of said knee pad so to help position the user's leg.

16. The apparatus of claim 11 and means mounting said support post to said body support frame in a plurality of positions relative to said body support frame.

17. In a mobile ambulatory apparatus including a mobile frame having a first end and a second end, a ground engaging stabilizing member mounted to said mobile frame proximate at least one of said first end and said second end, a pair of drive wheels mounted to opposed sides of said mobile frame between said first end and said second end; and a body support frame mounted to said mobile frame between said drive wheels, a foot rest mounted to said body support frame, and a support mounted to said body support frame in spaced relation above said foot rest for support of a user while standing on said foot rest, an improvement in said mobile ambulatory apparatus comprising:

means mounting said body support frame to said mobile frame for a combination of rotational and translational movement between a generally upright orientation and an inclined orientation.

18. The apparatus of claim 17 wherein, means mounting said body support frame to said mobile frame including a linear actuator having a movable end.

19. The apparatus of claim 18 wherein, said body support frame is pivotally secured to said movable end and said body support frame is pivotally secured to said mobile frame through a rigid link.

20. The apparatus of claim 19 and, a weight compensator connected to said rigid link.

21. A mobile inclinable stander comprising:

a mobile frame having first and second ends with ground engaging stabilizing members toward the first and second ends and drive wheels between the first and second ends;

a body support frame tiltably mounted to the mobile frame for movement between a generally upright orientation and a generally reclined orientation;

a chest support and a waist support mounted to the body support frame at first and second positions respectively; and a knee support, mounted to the body support frame, comprising:

a generally horizontal support post mounted to the body support frame;

a pivot tube pivotally mounted to the support post;

first and second spaced apart knee pad posts secured to the pivot tube and movable therewith; and first and second spaced apart knee pads secured to the knee pad posts at positions on either side of the pivot tube, the knee pads sized and positioned &:o engage the user's leg on either side of the knee cap.

22. The apparatus of claim 21 further comprising positioning, rings mounted onto the support post and on either side of the pivot tube so to position the pivot tube along the support post according to the number of the positioning rings on either side of the pivot tube.

23. The apparatus of claim 22 wherein the positioning rings are made of a rubberized material which supplies frictional resistance to the pivotal movement of the pivot tube about the support post.

24. The apparatus of claim 21 wherein knee support includes a lateral support secured to a chosen one of the support posts and the pivot tube and extending generally horizontally and to one side of the knee pads so to help position the user's leg.

25. The apparatus of claim 21 further comprising means for mounting the support post to the body support frame in a plurality of positions relative to the body support frame.

26. A mobile stander comprising:

a mobile frame having a first end and a second and with ground engaging stabilizing members mounted to each of said first end and said second end and drive wheels mounted to said mobile frame between the first end and said second end;

a generally upright body support frame mounted to said mobile frame;

one of a waist support and a chest support mounted to said body support frame; and a knee support assembly, mounted to said body support frame, said knee support assembly including two generally horizontal support posts mounted to said body support frame;

a pivot tube pivotally mounted to each of said support posts;

a first knee pad post secured to one of said pivot tubes and movable therewith; and a second knee pad post secured to the other of said pivot tubes and movable therewith; and first and second spaced apart knee pads secured to each of said pad posts at positions on either side of each of said pivot tubes, said knee pads being sized and positioned to engage the user's leg on either side of the knee cap.

27. The apparatus of claim 26 wherein, said knee support assembly includes a lateral support secured to a chosen one of said support posts and said pivot tubes, and a lateral support extending generally horizontally and to one side of said knee pads so to help position the user's leg.

* * * * *

UNITED STATES PATENT AND TRADEMARK OFFICE
CERTIFICATE OF CORRECTION

PATENT NO. : 5,172,925

DATED : December 22, 1992

INVENTOR(S) : Talton C. Kendrick, et al.

It is certified that error appears in the above-identified patent and that said Letters Patent is hereby corrected as shown below:

Column 4, line 15, delete "4" and insert ---14---.
Column 5, line 50, (see Amendment dated 3-6-92) after "Seat" insert ---assembly---.

Column 8, line 13, Claim 7, (see Amendment dated 3-6-92) after "and a" delete "wist" and insert ---waist---.
Column 8, line 55, Claim 9, after "clamping plate" insert ---together---.
Column 9, line 8, Claim 11, after "foot" insert ---rest---.
Column 9, line 8, Claim 11, after "support" delete "at" and insert ---of---.
Column 9, line 29, Claim 14, before "material" delete "rubber" and insert ---rubberized---.
Column 10, line 20, Claim 21, before "engage" delete "&:0" and insert ---to---.
Column 10, line 23, Claim 22, after "positioning" delete the comma ",".

UNITED STATES PATENT AND TRADEMARK OFFICE

CERTIFICATE OF CORRECTION

PATENT NO. : 5,172,925

DATED : December 22, 1992

INVENTOR(S) : Talton C. Kendrick, et al

It is certified that error appears in the above-indentified patent and that said Letters Patent is hereby corrected as shown below:

Column 10, line 40, Claim 26, after "second" delete "and" and insert ---end---.

Signed and Sealed this

Eighteenth Day of January, 1994

Attest:

Bruce Lehman

BRUCE LEHMAN

*Attesting Officer*

*Commissioner of Patents and Trademarks*